(12) United States Patent
Hutchings et al.

(10) Patent No.: US 8,980,083 B2
(45) Date of Patent: Mar. 17, 2015

(54) WATER TREATMENT APPARATUS

(75) Inventors: Keith Garry Hutchings, Weston-super-Mare (GB); Michael Guy Faram, North Somerset (GB)

(73) Assignee: Hydro International plc, Clevedon (GB)

( * ) Notice: Subject to any disclaimer, the term of this patent is extended or adjusted under 35 U.S.C. 154(b) by 415 days.

(21) Appl. No.: 13/505,182

(22) PCT Filed: Oct. 27, 2010

(86) PCT No.: PCT/GB2010/051802
§ 371 (c)(1),
(2), (4) Date: Aug. 16, 2012

(87) PCT Pub. No.: WO2011/051714
PCT Pub. Date: May 5, 2011

(65) Prior Publication Data
US 2013/0001144 A1    Jan. 3, 2013

(30) Foreign Application Priority Data

Oct. 30, 2009   (GB) .................................. 0919002.6

(51) Int. Cl.
*E03F 5/14*       (2006.01)
*C02F 3/32*       (2006.01)
(Continued)

(52) U.S. Cl.
CPC ............... *C02F 3/327* (2013.01); *E03F 5/0404* (2013.01); *C02F 1/001* (2013.01); *C02F 1/006* (2013.01); *C02F 2103/001* (2013.01); *E03F 5/14* (2013.01)
USPC ....... 210/150; 210/170.03; 210/254; 210/602

(58) Field of Classification Search
CPC ............. E03F 5/04; E03F 5/0404; E03F 5/14; C02F 1/006; C02F 3/046; C02F 3/327; C02F 2103/001
USPC ......... 210/150, 151, 170.03, 254, 602, 747.2, 210/747.3; 137/132, 140
See application file for complete search history.

(56) References Cited

U.S. PATENT DOCUMENTS 1,178,428 A * 4/1916 Tozier ........................... 210/162
4,253,965 A * 3/1981 Pielkenrood ................... 210/521
(Continued)

FOREIGN PATENT DOCUMENTS

| AU | 726262 B2 | 11/2000 |
| DE | 19801116 A1 | 10/1998 |

(Continued)

OTHER PUBLICATIONS

International Search Report for Application PCT/GB2010/051802 dated Apr. 19, 2011.
(Continued)

*Primary Examiner* — Christopher Upton
(74) *Attorney, Agent, or Firm* — Honigman Miller Schwartz and Cohn LLP (57) ABSTRACT

A water treatment apparatus comprises a chamber divided by a partition into a treatment section and an outlet section. The treatment section may, for example, contain a filter media including organic material which supports a shrub or tree. Runoff water enters the treatment section over an inlet chamber which forms a bridge over the outlet section. During heavy flow conditions, some of the incoming water overflows inlet bypass weirs to pass directly to the outflow section, bypassing the filter media in the treatment section.

36 Claims, 4 Drawing Sheets

(51) Int. Cl.
*E03F 5/04* (2006.01)
*C02F 1/00* (2006.01)
*C02F 103/00* (2006.01)

(56) References Cited

U.S. PATENT DOCUMENTS

| | | | |
|---|---|---|---|
| 4,975,205 A * | 12/1990 | Sloan | 210/800 |
| 5,498,331 A | 3/1996 | Monteith | |
| 5,707,527 A * | 1/1998 | Knutson et al. | 210/170.03 |
| 6,062,767 A * | 5/2000 | Kizhnerman et al. | 210/170.03 |
| 6,077,448 A | 6/2000 | Tran-Quoc-Nam et al. | |
| 6,200,484 B1 | 3/2001 | McInnis | |
| 6,241,881 B1 | 6/2001 | Pezzaniti | |
| 7,425,261 B2 | 9/2008 | Siviter et al. | |
| 8,480,887 B2 * | 7/2013 | Andoh et al. | 210/170.03 |
| 2005/0056587 A1 | 3/2005 | Allen et al. | |
| 2008/0217257 A1 * | 9/2008 | Pank | 210/747 |
| 2009/0255868 A1 * | 10/2009 | Allen et al. | 210/170.03 |
| 2010/0206790 A1 * | 8/2010 | Holtz | 210/150 |

FOREIGN PATENT DOCUMENTS

| | | |
|---|---|---|
| EP | 0237481 A2 | 9/1987 |
| EP | 1420115 A2 | 5/2004 |
| GB | 2459896 A | 11/2009 |
| WO | WO-2006133503 A1 | 12/2006 |

OTHER PUBLICATIONS

Search Report from U.K. Patent Office for Application GB0919002.6 dated Apr. 13, 2010.
Search Report from U.K. Patent Office for Application GB0919002.6 dated Feb. 26, 2010.

* cited by examiner

WATER TREATMENT APPARATUS

This invention relates to a water treatment apparatus and particularly, though not exclusively, relates to a water treatment apparatus for treating storm water runoff.

Development of land often results in increased storm water runoff. Such increased runoff can carry with it a range of pollutants from diverse sources which, if discharged directly into natural watercourses, could cause damage to the local environment. Storm water treatment systems aim to remove pollutants from surface runoff prior to the runoff being discharged to surface waters or percolating into the ground water. A variety of such storm water treatment systems is known in the art, including bio filtration systems in which filtration is achieved at least in part by organic filtration media. Such a system is disclosed in U.S. Pat. No. 7,425,261, and provides for stormwater to be filtered through, and temporarily retained by, a filtration media that may comprise a non organic matrix material and an organic matrix material, including topsoil, that can support plant growth. A problem with existing treatment systems is that they can be expensive to manufacture, requiring complicated casting and/or fabrication.

At certain times, flow rates of storm water runoff can exceed the hydraulic and/or treatment capacity of installed storm water treatment systems. There is therefore a need for a bypass facility to ensure that at times of heavy flow, storm water runoff bypasses the treatment facility of the treatment system, avoiding surcharging of the system. It is desirable to achieve high flow bypass without unduly increasing the complexity of the system and its associated costs.

According to the present invention, there is provided a water treatment apparatus comprising a chamber that is divided by a partition into a treatment section and an outflow section, the treatment section communicating with the outflow section via a screening element, the apparatus further comprising an inlet channel for conveying water to the treatment section, the inlet channel having an inlet lip over which, in use, water is discharged into the treatment section and an inlet bypass weir at a level higher than the inlet lip for discharging water into the outflow section.

The present invention thus provides a simplified construction, in which the treatment section and the outflow section are provided within a single chamber, separated by the partition. The inlet bypass weir communicates directly with the outflow section to enable high flow bypass to take place immediately at the inlet to the apparatus.

The inlet bypass weir may comprise a siphon, which under some inlet flow conditions may operate to maintain a level in the inlet channel below the level of the inlet bypass weir, to provide a desired head at the inlet lip.

The partition and the inlet channel may be integrally formed as an insert, thus further simplifying construction. The insert may, for example, be fabricated by folding and welding a sheet material, such as stainless steel. Other materials may be suitable, such as plastics materials.

The inlet lip defined by the inlet housing may have a straight edge. Alternatively, the edge of the inlet lip may have a saw tooth or other configuration to disperse the incoming flow.

The partition may be provided with a shelf projecting into the treatment section of the chamber substantially normal to the partition and substantially parallel to a base of the chamber. The shelf may extend across substantially the entire width of the partition or the shelf may extend across that region of the partition that is aligned with the inlet lip.

The inlet channel may extend above the outflow section. For example, the inlet channel may comprise a bridge extending from a wall of the apparatus defining the chamber to the partition. The inlet bypass weir may be provided at at least one side edge of the inlet channel, whereby water discharged over the inlet bypass weir falls directly into the outflow section.

The inlet lip may be situated at an upper edge of the partition.

According to another aspect of the present invention, there is provided a water treatment apparatus comprising a chamber that is divided by a partition into a treatment section and an outflow section, the treatment section communicating with the outflow section via a screening element, the apparatus further comprising an inlet that communicates directly with the treatment section and an outlet that communicates directly with the outflow section, the partition comprising a treatment bypass weir enabling overflow from the treatment section to the outflow section of the chamber, wherein the treatment bypass weir comprises a siphon. Under some inlet flow conditions the siphon may operate to maintain a level in the treatment section below the level of the treatment bypass weir.

The screening element of either aspect of the present invention may comprise a perforated panel, which may be corrugated or otherwise profiled so as to increase the surface area of the panel presented to the treatment section of the chamber. The perforated panel may be mounted in the partition and may be mounted near a base of the chamber.

The screening element may comprise a perforated pipe. The perforated pipe may extend within the treatment section to open into the outflow section of the chamber. The perforated pipe may open to an exterior of the chamber. The perforated pipe may extend near a base of the chamber.

The water treatment apparatus of either aspect of the present invention may further comprise a filtration media disposed in the treatment section of the chamber. The filtration media may comprise organic material, for example in a mixture of organic material and non-organic material such as sand and/or aggregate. The apparatus may further comprise live plant material growing in the filtration media. The live plant material may, for example, be a tree or shrub with roots in the filtration media.

The water treatment apparatus may be for treating storm water runoff.

The chamber of the water filtration apparatus may be cylindrical or may be polygonal, for example rectangular.

The chamber may be open to the atmosphere and may further comprise a removable cover having an opening for admitting growth of live plant material.

For a better understanding of the present invention, and to show more clearly how it may be brought into effect, reference will now be made, by way of example, to the following drawings in which.

Figure 1:
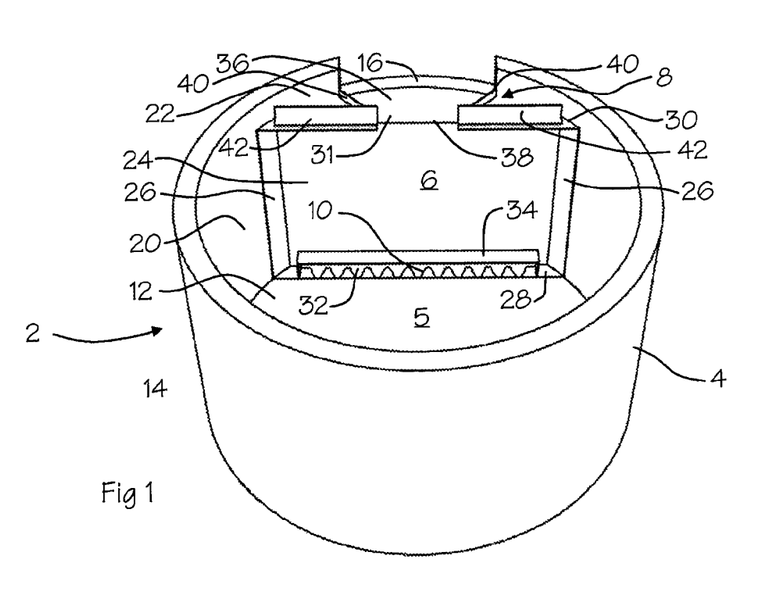
FIG. 1 is a perspective view of a water treatment apparatus.
Figure 2:
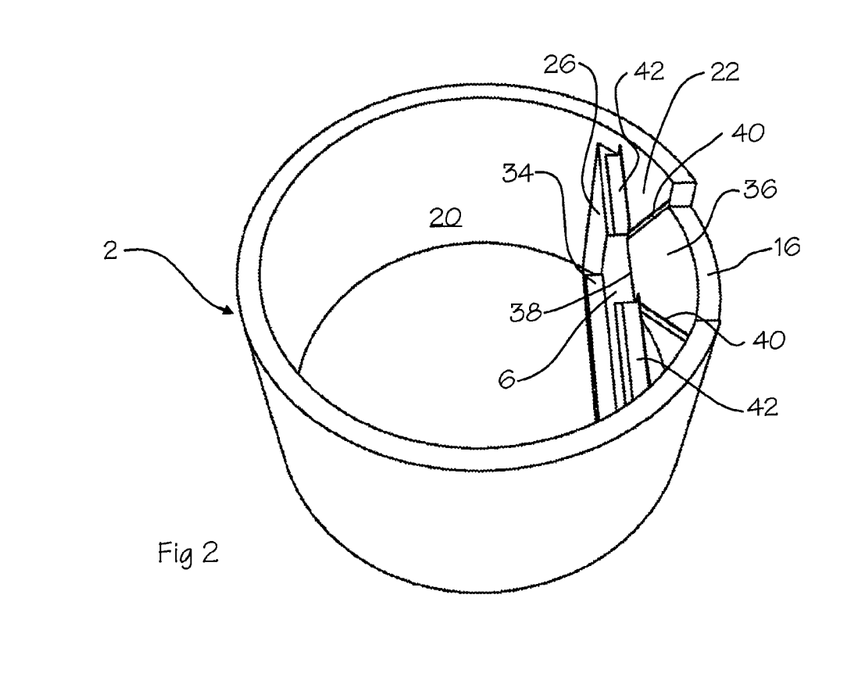
FIG. 2 is an alternative perspective view of the water treatment apparatus of FIG. 1.
Figure 3:
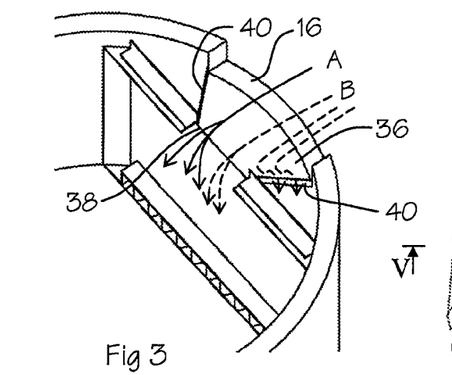
FIG. 3 is a partially cut away view of the water treatment apparatus of FIG. 1.

With reference to FIGS. 1 to 3, a water treatment apparatus 2 comprises a vessel 4 which comprises a base 12 and a cylindrical outer wall 14 defining a chamber 5. The outer wall 14 is notched at its upper edge to define an inlet 16. The vessel 4 is formed from a construction material substantially impermeable to water such as concrete.

A partition 6 in the form of an insert is installed in the chamber 5. The partition 6 is fabricated from a corrosion-resistant material such as stainless steel and is secured to the base 12 and the outer wall 14 by suitable fastenings (not shown). The partition 6 fits inside the chamber 5 so as to divide the chamber 5 into two discrete volumes; a larger treatment section 20 and a smaller outflow section 22. The partition 6 includes a main dividing wall 24, side flanges 26 and a base flange 28 by which the partition 6 is secured to the vessel 4, and an upper flange 30 which is interrupted to define an inflow opening 31.

The inlet 16 is provided at a region of the cylindrical outer wall 14 that bounds the outflow section 22. An inlet channel 8 of the partition 6 acts as a bridge extending from the inlet 16 at the outer wall 14 to the partition 6, thus ensuring that the inlet 16 communicates along the inlet channel 8 with the treatment section 20. An outlet (not shown) opens near the base of the cylindrical outer wall 14 and at a region of the cylindrical outer wall 14 that bounds the outflow section 22. The outlet thus communicates directly with the outflow section 22.

The partition 6 includes a corrugated screening element 10 which comprises a perforated plate that is corrugated in the vertical direction and is housed within an opening 32 in the partition 6. The opening 32 is at the base of the partition 6 so that the corrugated plate 10 is positioned adjacent the base 12 of the chamber 4. The opening 32 in the partition 6 is bounded by a housing 34 that encapsulates the corrugated plate such that the only communication between the treatment section 20 and the outflow section 22 at the level of the plate 10 is via the perforations in the plate 10.

Figure 4:
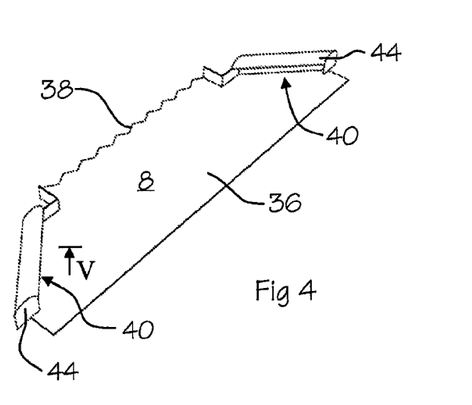
FIG. 4 is a perspective view of an inlet channel in an alternative embodiment of a water treatment apparatus.

The inlet channel 8 comprises a planar bridge 36, which terminates at an inlet lip 38 situated at the upper edge of the partition 6, and two inlet bypass weirs 40 which extend along the side edges of the planar bridge 36 from the inlet 16 to the partition 6. The bridge 36 extends from the inlet 16 of the vessel 4 to the inflow opening 31 that is defined by the upper flange 30 of the partition 6. The bridge 36 extends across the width of the main dividing wall 24 of the partition 6 so that water flowing over the bridge 36 spills over the inlet lip 38 and into the treatment section 20. The inlet lip 38 may be a straight edge, as illustrated in FIGS. 1 to 3, or may have a saw tooth profile, as illustrated in FIG. 4. The inlet bypass weirs 40 serve as side walls to the bridge 36, directing flow of water towards the inlet lip 38.

Two L shaped members 42 are mounted on the upper flange 30 of the partition 8, either side of the inflow opening 31. The L shaped members extend inwardly of the chamber 5 from the outer wall 14 to the inflow opening 31, where they meet the inlet bypass weirs 40. The L shaped members 42 extend upwardly beyond the inlet bypass weirs 40.

In operation, the treatment section 20 of the chamber 4 is filled with a filtration media (not shown). This may comprise a mixture of organic and non organic filtration media such as mulch, a soil mixture and live plant material, as described, for example, in U.S. Pat. No. 7,425,261. Any suitable filtration media may be employed with the apparatus of the present invention.

The water treatment apparatus described above may be installed underground adjacent a paved area such as a road surface. For example, the inlet 16 may be disposed in a roadside kerb to receive runoff water from the road.

Under normal operating conditions, storm water runoff enters the apparatus 2 via the inlet 16 and follows path A in FIG. 3, being directed by the inlet bypass weirs 40 to flow across the bridge 36 of inlet channel 8 and spill over inlet lip 38 into the treatment section 20 of the chamber 5. The water then percolates through the filtration media during which process pollutants carried in the water are filtered out by the filtration media. Filtered water at the base of the treatment section 20 passes through the corrugated perforated plate 10 and into the outflow section 22 of the chamber 4. The vertical corrugations in the plate 10 increase the surface area of the plate presented to the filtration media and water. The perforations in the plate 10 permit through flow of filtered water but prevent passage of the filtration media from the treatment section 20 into the outflow section 22. From the outflow section 22 of the chamber 4, filtered water flows though the outlet (not shown) and is directed eventually to a natural watercourse or other suitable discharge point.

Under high flow operating conditions, storm water runoff enters the apparatus 2 via the inlet 16 and follows paths B in FIG. 3. Some of the water entering the inlet 16 is directed over the bridge 36 and inlet lip 38 to enter the treatment section 20, percolate through the filtration media and exit the apparatus as described above with reference to path A. However, if the volume of water flowing into the inlet 16 becomes too great to be accepted by the inflow opening 31, or the filtration media becomes saturated, the water level on the bridge 36 of the inlet housing 8 increases until it reaches the height of the inlet bypass weirs 40. Water then spills over the inlet bypass weirs 40 to fall directly into the outflow section 22. From the outflow section 22, the overflowing water mixes with the filtered water entering the outflow section 22 from the treatment section 20, and exits the chamber 4 via the outlet (not shown) from where it is directed to a natural watercourse or other suitable discharge point.

It will be understood that, although FIG. 3 illustrates paths B as flowing over only one of the inlet bypass weirs 40, in normal use, both of the inlet bypass weirs will operate to allow excess water to bypass the treatment section 20 and flow directly to the outflow section 22 and the outlet.

Figure 5:
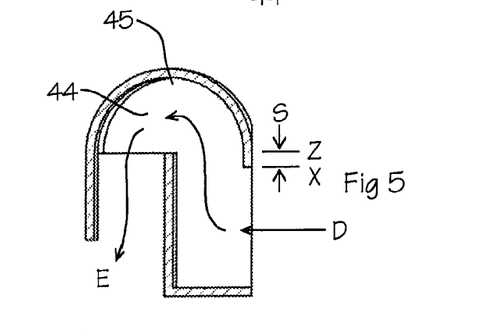
FIG. 5 is a sectional view on the line V-V in FIG. 4.

Certain variations of the basic structure of the apparatus 2 are contemplated within the scope of the present invention. With reference to FIGS. 4 and 5, the inlet bypass weirs 40 may comprise siphons 44. Water enters the siphon along path D, spills over the weir at level Z and exits the siphon along path E to enter the outflow section 22. If this flow continues, the siphon may prime. Once primed, the siphon will continue to operate, pulling the head of the flow over the bridge 36 down to a level at which the siphon may alternately partially break and reprime thereby maintaining a controlled head at the inlet lip.

Figure 6:
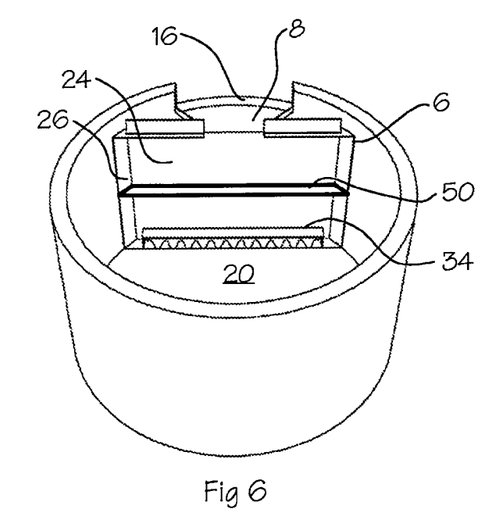
FIG. 6 corresponds to FIG. 1 but shows a variant of the water treatment apparatus.
Figure 7:
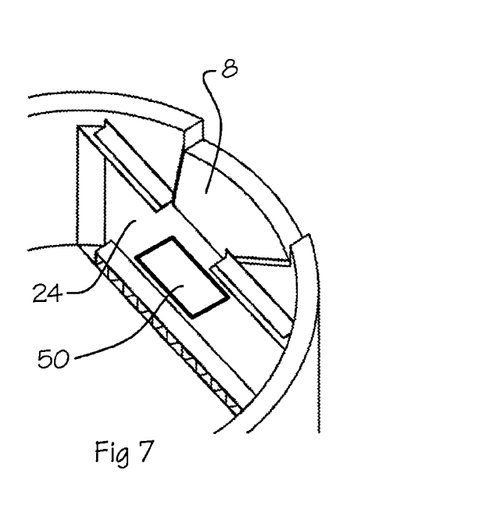
FIG. 7 is a partially cut away view of a further variant of the water treatment apparatus of FIG. 6.

With reference to FIGS. 6 and 7, the partition 8 may further comprise a shelf 50. The shelf 50 extends from the main dividing wall 24 of the partition 8 into the treatment section 20 of the chamber 4. The shelf 50 extends substantially normal to the main dividing wall 24 and parallel to the base 12 of the chamber 4. The level at which the shelf extends from the main dividing wall 24 of the partition 8 may be selected according to desired operating parameters and may be at approximately half the height of the main dividing wall 24, as illustrated in FIG. 6. The shelf may extend across substantially the entire width of the partition 8, as illustrated in FIG. 6, or may extend only across that width of the partition 8 that is aligned with the inlet lip 38 and inflow opening 31, as illustrated in FIG. 7.

In operation, the shelf 50 acts to prevent flow of water down the wall of the partition. At certain flow rates, it is possible that water will spill over the inlet lip 38 and down the main dividing wall 24 of the partition 8 to the housing 34, through the plate 10 and into the outflow chamber 22. Such flow can follow a linear path down the main dividing wall 24, thus bypassing the filtration media on its transit through the treatment section 20. The shelf 50 directs water flowing down the main dividing wall 24 away from the wall and into the filtration media, thus protecting the filtration media adjacent the wall and ensuring that water transiting through the treatment section 20 is subjected to the filtration process.

Figures 8, 9, 10, 10A:
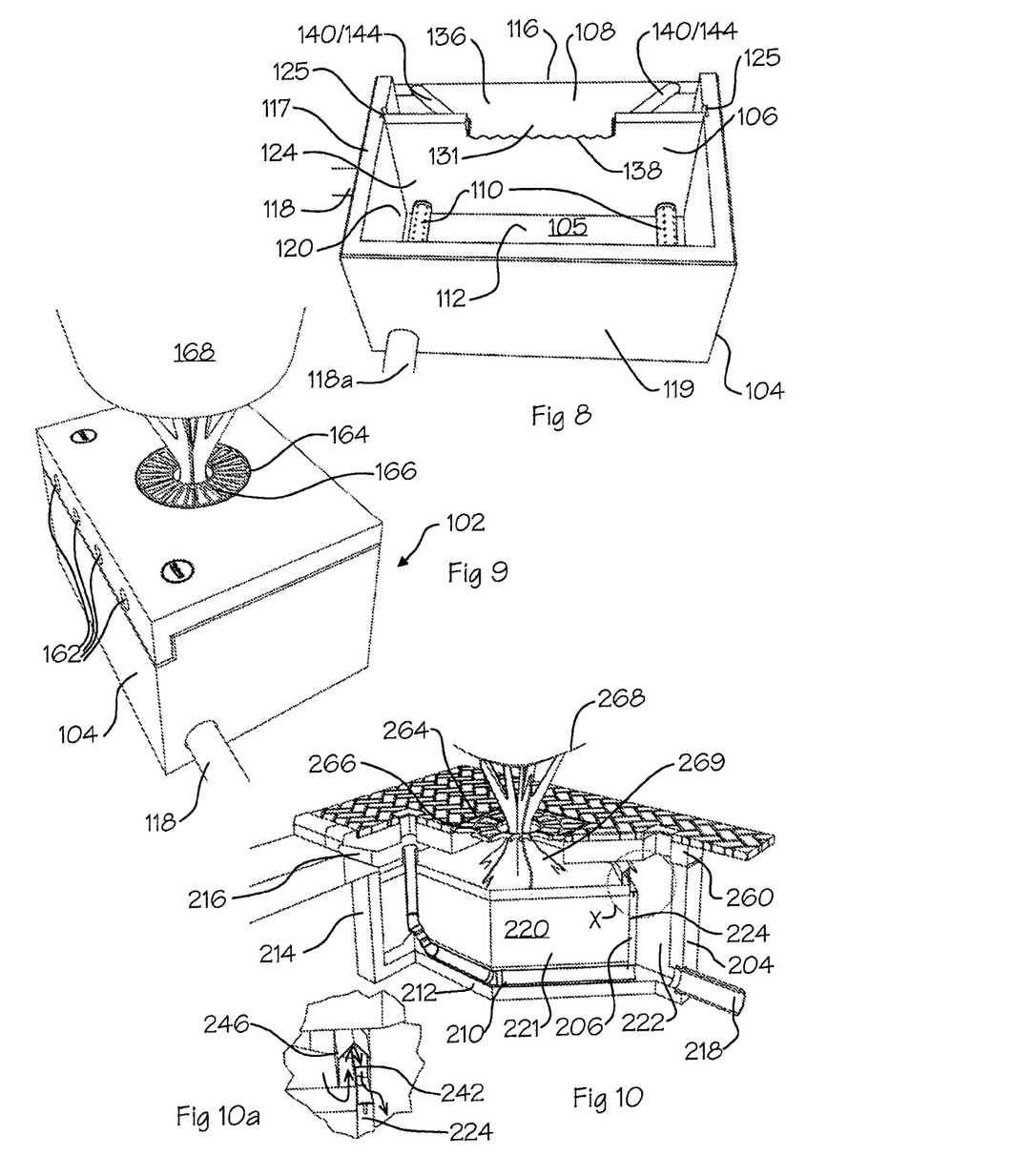
FIG. 8 is a perspective view of another embodiment of a water treatment apparatus.
FIG. 9 shows the water treatment apparatus of FIG. 8 in use.
FIG. 10 is a partially cut away, perspective view of a third embodiment of water treatment apparatus.
FIG. 10a is an enlarged view of the region X in FIG. 10.

Another embodiment of water treatment apparatus 102 is illustrated in FIG. 8. The water treatment apparatus 102 comprises a vessel 104, a partition 106, an inlet channel 108 and screening elements 110 in the form of perforated pipes. The vessel 104 is of rectangular shape and comprises a base 112 and outer walls 114 that include a front wall 115, side walls 117 and a back wall 119. The vessel 104 further comprises an inlet 116 and an outlet 118. The vessel 104 and the partition 106 are formed from a construction material substantially impermeable to water such as concrete, while the inlet channel 108 is fabricated from a corrosion-resistant material such as stainless steel.

The vessel 104 defines a chamber 105, and the partition 106 fits inside the chamber 105 so as to divide the chamber 105 into two discrete volumes: a larger treatment section 120 towards a rear of the chamber 105 and a smaller outflow section 122 towards a front of the chamber 105. The partition 106 comprises a dividing wall 124 that is received in two cooperating recesses 125 in the side walls 117. An upper edge of the partition 108 is stepped downwards to provide an inflow opening 131. The partition 106 is received closely in the recesses 125 and may be sealed in place. Alternatively, the partition 106 and the vessel 104 may be integrally formed.

The inlet 116 of the vessel 104 opens through the front wall 115 that bounds the outflow section 122. The inlet channel 108 acts as a bridge to connect the inlet 116 to the partition 106, thus ensuring that the inlet 116 communicates with the treatment section 120. The outlet 118 opens near the base of a side wall 117 and at a region of the side wall 117 that bounds the outflow section 122. The outlet 118 thus communicates directly with the outflow section 122.

The perforated pipes 110 extend through the treatment section 120, near the base 112 of the vessel 104. The pipes 110 extend from the back wall 119 of the chamber 104, at which they have a closed end, to the partition 106. The pipes 110 pass through the partition 106 to open into the outflow section 122. The pipes 110 are closely received by the partition 106 such that the only communication between the treatment section 120 and the outflow section 122 at the level of the pipes 110 is via the perforations in the pipes 110.

In an alternative embodiment (illustrated by dashed lines) at least one of the pipes 110 may pass through the back wall 119 of the vessel 104 to communicate with a second and/or alternative outlet 118a.

The inlet channel 108 comprises a planar bridge 136, which terminates at an inlet lip 138, and two inlet bypass weirs 140 which extend along the side edges of the planar bridge 136 from the inlet 116 to the partition 106. The bridge 136 extends from the inlet 116 of the chamber 104 to the inflow opening 131. The bridge 136 extends across the width of the dividing wall 124 of the partition 106 so that water flowing over the bridge 136 spills over the inlet lip 138 and into the treatment section 120. In the embodiment of FIG. 8, the inlet lip has a saw tooth profile, but it may have other shapes, and may be a straight edge as in the embodiment of FIGS. 1 to 3. The inlet bypass weirs 140 serve as side walls to the bridge 136, directing flow of water towards the inlet lip 138, and may be constructed in the form of siphons 144, as described above with reference to FIG. 5. Inner ends of the inlet bypass weirs 140 contact the partition 106 to assist in directing flow of water over the inlet lip 138. On each side of the inflow opening 131, the partition 106 extends upwardly to a level above that of the inlet bypass weirs 140.

FIG. 9 shows the apparatus in use. The vessel 104 is provided with a removable cover or lid 160 formed from the same material as the vessel 104. The cover 160 closes the chamber 105 and includes inlet openings 162 to guide the flow of water through the inlet 116 of the chamber 104 for example from a roadway. Alternative shapes or dispositions of inlet openings 162 to those illustrated in FIG. 9 are also contemplated. The cover 160 includes an opening 164, which may be at least partially obscured by a grille 166. The opening 164 and grille 166 combine to permit growth of live plant material such as a tree or shrub 168 out of the chamber 104. The roots of the live plant material 168 are anchored in the filtration media in the treatment section 120.

The second embodiment of water treatment apparatus 102 functions in substantially the same manner as the first embodiment of water treatment apparatus 2 described above and may include any or all of the additional features described with respect to the first embodiment of water treatment apparatus 2. It will also be appreciated that the pipes 110 of water treatment apparatus 102 may be employed in place of the corrugated screening element 10 in water treatment apparatus 2. Similarly, the corrugated screening element 10 of water treatment apparatus 2 may be employed in place of the filtration pipes 110 in water treatment apparatus 102.

It will be appreciated that a similar cover of appropriate shape may be employed with the embodiment of water treatment apparatus 2 shown in FIGS. 1 to 3, to substantially the same effect.

Figure 11:
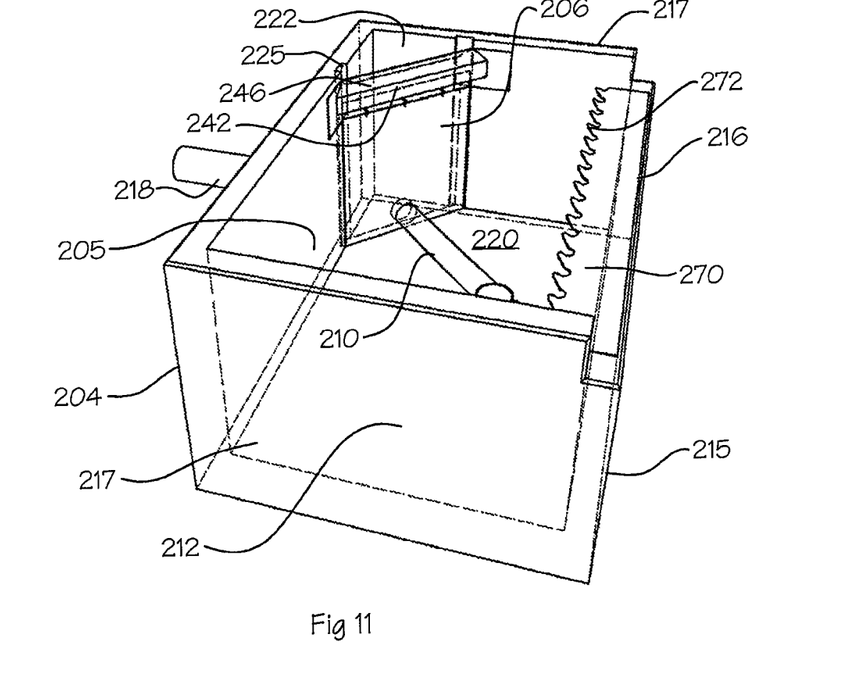
FIG. 11 shows a variant of the water treatment apparatus of FIG. 10.
Figure 12:
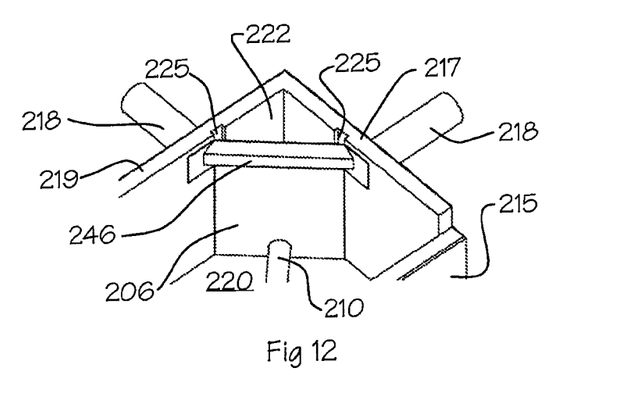
FIG. 12 is a fragmentary view of the water treatment apparatus of FIG. 11.

With reference to FIGS. 10 to 12, another embodiment of water treatment apparatus 202 comprises a vessel 204, a partition 206, and a screening element 210 in the form of a perforated pipe. The vessel 204 comprises a base 112 and outer walls 214 that include a front wall 215, side walls 217 and a back wall 219. The vessel 204 further comprises an inlet 216 and an outlet 218. The vessel 204 and partition 206 are both formed from a construction material substantially impermeable to water such as concrete.

The vessel 204 defines a chamber 205, and the partition 206 fits inside the chamber 205 so as to divide the chamber 204 into two discrete volumes; a larger treatment section 220 towards a front of the chamber 205 and a smaller outflow section 222 towards a rear of the chamber 205. The partition 206 comprises a dividing wall 224 that is received in two cooperating recesses 225 in the back and side walls 219, 217. The outflow section 222 is thus formed from a rear corner of the chamber 205. The partition 206 is received closely in the recesses 225 and may be sealed in place. Alternatively, the partition 206 and the vessel 204 may be integrally formed.

The partition further comprises a treatment bypass weir 242 defined by an upper edge of the partition 206. The treatment bypass weir may comprise a siphon 246, as illustrated in FIGS. 10 to 12 and as shown particularly in FIG. 10a.

The inlet 216 of the vessel 204 opens through the front wall 215 directly into the treatment section 220 of the chamber 204. The outlet 218 opens near the base of a rear or side wall 219, 217 and at a region of the rear or side wall 219, 217 that bounds the outflow section 222. The outlet 218 thus communicates directly with the outflow section 222.

The pipe 210 extends through the treatment section 220, near the base 212 of the vessel 204. The pipe 210 extends across the treatment section 220 and passes through the partition 206 to open into the outflow section 222. The pipe 210 is closely received by the partition 206 such that the only communication between the treatment section 220 and the outflow section 222 at the level of the pipe 210 is via the perforations in the pipe 210. The pipe 210 may either terminate at a closed end near the front of the vessel 204 or, as illustrated in FIG. 10, may extend upward through the treatment section 220 to open to the top of the vessel 204. An open end to the pipe 210 near the top of the vessel 204 may serve to admit cleaning fluid through the pipe or to allow the removal of debris. It will be appreciated that the corrugated screening element 10 of water treatment apparatus 2 shown in FIGS. 1 to 3 may be employed in place of the pipe 210 in water treatment apparatus 202 shown in FIGS. 10 to 12.

The apparatus further comprises an inlet shelf 270 mounted in the inlet 216 of the vessel 204. The inlet shelf 270 defines an inlet lip 272, over which water must spill to enter the treatment section of the chamber. In the embodiment of FIG. 11, the inlet lip 272 has a toothed profile, but it may have other shapes and may be a straight edge as in the embodiment of FIGS. 1 to 3.

In operation, the treatment section 220 of the chamber 204 is filled with a filtration media 221. This may comprise a mixture of organic and non organic filtration media such as mulch, a soil mixture and live plant material as described for example in U.S. Pat. No. 7,425,261. Any suitable filtration media may be employed with the apparatus of the present invention.

FIG. 10 shows the apparatus 202 in use. The vessel 204 is provided with a removable cover or lid 260 formed from the same material as the vessel 204. The cover 260 closes the chamber 205 and includes inlet openings to guide the flow of water through the inlet 216 of the vessel 204. The cover 260 includes an opening 264, which may be at least partially obscured by a grille 266. The opening 264 and grille 266 combine to permit growth of live plant material such as a tree or shrub 268 out of the chamber 205. The roots 269 of the live plant material 268 are anchored in the filtration media 221 in the treatment section 220.

The water treatment apparatus described above may be installed underground adjacent a paved area such as a road surface. For example, the inlet 216 may be disposed in a roadside kerb to receive runoff water from the road.

Under normal operating conditions, storm water runoff enters the apparatus 202 via the inlet 216 and flows over inlet shelf 270 to spill over inlet lip 272 into the treatment section 220 of the chamber 204. The water then percolates through the filtration media 221 during which process pollutants carried in the water are filtered out by the filtration media. Filtered water at the base of the treatment section 220 passes into the pipe 210 and into the outflow section 222 of the chamber 204. The perforations in the pipe 210 permit through flow of filtered water but prevent passage of the filtration media from the treatment section 220 into the outflow section 222. From the outflow section 222 of the chamber 204, filtered water flows though the outlet 218 and is directed eventually to a natural watercourse or other suitable discharge point.

Under high flow operating conditions, water may enter the treatment section 220 through the inlet 216 at a greater rate than can be accommodated by the filtration media 221. In this case the filtration media becomes saturated and a head of water builds up above the filtration media 221 in the treatment section 220. As flow increases, this head of water reaches the level of treatment bypass weir 242. Water then spills over the treatment bypass weir 242 to enter the outflow chamber 222 and exit the apparatus 202 via the outlet.

The invention claimed is:

1. A water treatment apparatus, comprising:
    a chamber that is divided by a partition into:
        a treatment section, and
        an outflow section, wherein the treatment section communicates with the outflow section via a screening element; and
    an inlet channel for conveying water to the treatment section, the inlet channel having:
        an inlet lip over which, in use, water is discharged into the treatment section, and
        an inlet bypass weir at a level higher than the inlet lip for discharging water into the outflow section, wherein the inlet bypass weir comprises a siphon, wherein the siphon is arranged such that, in use, a level of the water in the inlet channel is maintained below the level of the inlet bypass weir for at least some inlet flow conditions.

2. A water treatment apparatus as claimed in claim 1, wherein the partition and the inlet channel are integrally formed as an insert which is installed in the chamber.

3. A water treatment apparatus as claimed in claim 1, wherein the inlet lip has a straight edge.

4. A water treatment apparatus as claimed in claim 1, wherein the inlet lip has a saw tooth configuration.

5. A water treatment apparatus as claimed in claim 1, wherein the partition is provided with a shelf projecting into the treatment section of the chamber substantially normal to the partition and substantially parallel to a base of the chamber.

6. A water treatment apparatus as claimed in claim 5, wherein the shelf extends across substantially the entire width of the partition.

7. A water treatment apparatus as claimed in claim 5, wherein the shelf extends across that region of the partition that is aligned with the inlet lip.

8. A water treatment apparatus as claimed in claim 1, wherein the inlet channel extends above the outflow section.

9. A water treatment apparatus as claimed in claim 8, wherein the inlet channel comprises a bridge extending across the outflow section from a wall of the apparatus defining the chamber to the partition.

10. A water treatment apparatus as claimed in claim 8, wherein the inlet bypass weir is provided at least one side edge of the inlet channel, whereby water discharged over the inlet bypass weir falls directly into the outflow section.

11. A water treatment apparatus as claimed in claim 1, wherein the inlet lip is situated at an upper edge of the partition.

12. A water treatment apparatus as claimed in claim 1, wherein the screening element comprises a perforated pipe.

13. A water treatment apparatus as claimed in claim 12, wherein the perforated pipe extends through the treatment section to open into the outflow section of the chamber.

14. A water treatment apparatus as claimed in claim 1, wherein the screening element comprises a perforated panel.

15. A water treatment apparatus as claimed in claim 14, wherein the perforated panel is corrugated.

16. A water treatment apparatus as claimed in claim 14, wherein the perforated panel is mounted in the partition.

17. A water treatment apparatus as claimed in claim 1, wherein the apparatus further comprises a filtration media disposed in the treatment section of the chamber.

18. A water treatment apparatus as claimed in claim 17, wherein the filtration media includes organic material.

19. A water treatment apparatus as claimed in claim 17, wherein the apparatus further comprises live plant material growing in the filtration media.

20. A water treatment apparatus as claimed in claim 1, wherein the water treatment apparatus is for treating storm water runoff.

21. A water treatment apparatus as claimed in claim 1, wherein the chamber is cylindrical.

22. A water treatment apparatus as claimed in claim 1, wherein the chamber is polygonal.

23. A water treatment apparatus as claimed in claim 1, wherein the chamber further comprises a removable cover having an opening for admitting growth of live plant material.

24. A water treatment apparatus, comprising:
   a chamber that is divided by a partition into:
      a treatment section, and
      an outflow section, wherein the treatment section communicates with the outflow section via a screening element; and
   an inlet that communicates directly with the treatment section and an outlet that communicates directly with the outflow section, wherein the partition includes:
      a treatment bypass weir enabling overflow from the treatment section to the outflow section of the chamber, wherein the inlet, the treatment section and the treatment bypass weir are disposed in flow series, wherein the treatment bypass weir is a siphon, wherein the siphon is arranged such that, in use, a level of the water in the inlet channel is maintained below the level of the inlet bypass weir for at least some inlet flow conditions.

25. A water treatment apparatus as claimed in claim 24, wherein the screening element comprises a perforated pipe.

26. A water treatment apparatus as claimed in claim 25, wherein the perforated pipe extends through the treatment section to open into the outflow section of the chamber.

27. A water treatment apparatus as claimed in claim 24, wherein the screening element comprises a perforated panel.

28. A water treatment apparatus as claimed in claim 27, wherein the perforated panel is corrugated.

29. A water treatment apparatus as claimed in claim 27, wherein the perforated panel is mounted in the partition.

30. A water treatment apparatus as claimed in claim 24, wherein the apparatus further comprises a filtration media disposed in the treatment section of the chamber.

31. A water treatment apparatus as claimed in claim 30, wherein the filtration media includes organic material.

32. A water treatment apparatus as claimed in claim 30, wherein the apparatus further comprises live plant material growing in the filtration media.

33. A water treatment apparatus as claimed in claim 24, wherein the water treatment apparatus is for treating storm water runoff.

34. A water treatment apparatus as claimed in claim 24, wherein the chamber is cylindrical.

35. A water treatment apparatus as claimed in claim 24, wherein the chamber is polygonal.

36. A water treatment apparatus as claimed in claim 24, wherein the chamber further comprises a removable cover having an opening for admitting growth of live plant material.

\* \* \* \* \*